US008418202B2

(12) United States Patent
Ahmad-Taylor

(10) Patent No.: US 8,418,202 B2
(45) Date of Patent: Apr. 9, 2013

(54) METHOD AND SYSTEM FOR PROVIDING ON-DEMAND VIEWING

(75) Inventor: Ty O. Ahmad-Taylor, New York, NY (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1318 days.

(21) Appl. No.: 10/823,869

(22) Filed: Apr. 14, 2004

(65) Prior Publication Data

US 2005/0235316 A1 Oct. 20, 2005

(51) Int. Cl.
*G06F 3/00* (2006.01)
*G06F 13/00* (2006.01)
*H04N 5/445* (2011.01)
*H04N 5/238* (2006.01)

(52) U.S. Cl.
USPC ............... 725/41; 725/37; 725/38; 725/39; 725/40; 725/43; 725/44; 725/45; 725/46

(58) Field of Classification Search ......... 725/40, 725/44, 37–39, 45–47, 53, 56–57, 60–61; 348/563

See application file for complete search history.

(56) References Cited

U.S. PATENT DOCUMENTS

| | | | |
|---|---|---|---|
| 5,815,145 A * | 9/1998 | Matthews, III | 725/41 |
| 5,850,218 A * | 12/1998 | LaJoie et al. | 725/45 |
| 6,317,883 B2 | 11/2001 | Marics | |
| 6,331,877 B1 | 12/2001 | Bennington et al. | |
| 7,493,643 B2 * | 2/2009 | Ellis | 725/61 |
| 2003/0106054 A1 * | 6/2003 | Billmaier et al. | 725/39 |
| 2003/0167471 A1 * | 9/2003 | Roth et al. | 725/87 |
| 2003/0196206 A1 | 10/2003 | Shusman | |
| 2003/0220100 A1 | 11/2003 | McElhatten et al. | |
| 2004/0060063 A1 * | 3/2004 | Russ et al. | 725/46 |
| 2004/0068740 A1 * | 4/2004 | Fukuda et al. | 725/45 |
| 2004/0091236 A1 * | 5/2004 | Boston et al. | 386/46 |
| 2004/0111750 A1 * | 6/2004 | Stuckman et al. | 725/89 |
| 2004/0221308 A1 | 11/2004 | Cuttner et al. | |
| 2004/0239809 A1 * | 12/2004 | Kim et al. | 348/563 |
| 2005/0188384 A1 * | 8/2005 | Yogaratnam et al. | 719/331 |
| 2005/0262542 A1 * | 11/2005 | DeWeese et al. | 725/106 |
| 2006/0179454 A1 | 8/2006 | Shusman | |
| 2006/0253868 A1 * | 11/2006 | Ludvig et al. | 725/50 |
| 2006/0294548 A1 * | 12/2006 | Potrebic et al. | 725/46 |

OTHER PUBLICATIONS

International Search Report—PCT/US2005/08020—Mailing date Dec. 15, 2006.

* cited by examiner

*Primary Examiner* — Pankaj Kumar
*Assistant Examiner* — Alazar Tilahun
(74) *Attorney, Agent, or Firm* — Banner & Witcoff, Ltd.

(57) ABSTRACT

A method and system relating to an on-demand listings guide which is easy to use and that provides true on-demand viewing capabilities. One aspect of the method and system relates to electronically displaying an on-demand listings guide which includes information relating to at least one series and information relating to a plurality of episodes available on-demand from the series.

26 Claims, 5 Drawing Sheets

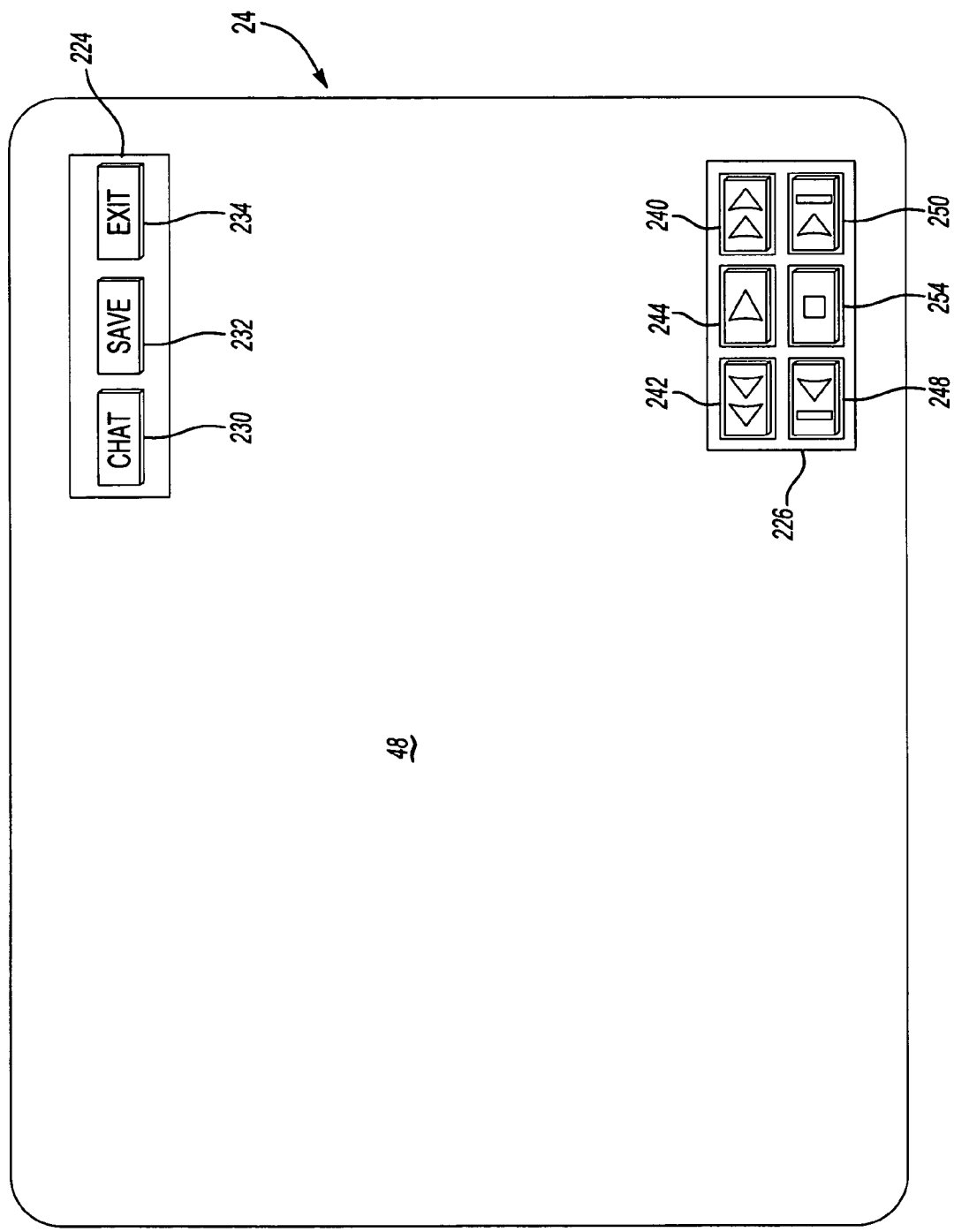

METHOD AND SYSTEM FOR PROVIDING
ON-DEMAND VIEWING

BACKGROUND OF THE INVENTION

1. Field of the Invention

The present invention relates to displaying an on-demand listings guide.

2. Background Art

Known on-demand listings guides are limited in functionality and ease of use. A user must navigate through a number of screens before selecting and ordering the desired content.

One known on-demand process requires performance of a number of selection steps in a number of separate screens. The user may initially be required to select a genre, then select a genre provider, then select a series, then select an episode from the series, before the desired episode can be ordered—each selection being made in a separate screen. The repeated selections and multiple screen navigation is not user-friendly.

One known on-demand process utilizes an electronic program guide (EPG). The

EPG sets aside a preset range of channels having semi-on-demand viewing at predefined time-slots. The user can navigate to the desired channel and time-slot to order the pay-per-view item for viewing at the indicated time. EPGs fail to provide true on-demand capabilities. The shows are not available at all times at the subscriber's demand, as the shows are only available during the preset time-slots. True on-demand viewing allows the subscriber to view shows anytime on-demand, as opposed to only during preset time-slots.

Therefore, there exists a need in the art to provide an on-demand listings guide for use in providing on-demand viewing that is user-friendly and provides true on-demand viewing capabilities.

SUMMARY OF THE INVENTION

It is, therefore, an object of the present invention to provide an on-demand listings guide that is user-friendly and provides true on-demand viewing capabilities.

The present invention contemplates a number of features for providing the listings guide, including a transceiver that receives on-demand services signals from an on-demand provider and outputs signals to a display. The transceiver can be a stand alone item or integrated with the display. Preferably, the transceiver provides an on-demand listings guide having true on-demand viewing.

In accordance with one aspect of the present invention, the on-demand listing guide displays a series and a plurality of episodes available on-demand for the series. For example, the series can relate to sit-com series, movie series, sports themes, or movie-channels series. The episodes can relate to sub-categories of particular versions of the series which may be available on-demand for each series, such as a particular episode in a sit-com series or a particular movie in a series of movies offered by a movie-channel.

Preferably, the series and episodes are displayed in the same screen. This allows the subscriber to order on-demand episodes without the inconvenience of navigation through a number screens and making one or more selections in each screen. This single-screen or same-screen approach greatly simplifies the process of selecting and viewing a desired episode.

In accordance with an aspect of present invention, a navigation tool can be included on the displayed guide or on a remote control. The subscriber can use the tool to navigate through the various series and episodes. The navigation tool can include an ordering button or other means to order a selected episode. The episodes are preferably available at all times for immediate on-demand viewing.

In accordance with an aspect of present invention, the guide includes a window for use in selecting the episodes. The window draws attention to a title of the episode, and optionally provides additional episode information on the same screen. The additional episode information can include a show rating, a detailed description, a show length, and audio information. The title and the episode information can be adjacent one another in the window such that the title and information appear side-by-side, top/bottom, or the like to ease association of the episode title with the episode information.

The window can include a portion which has actuatable buttons for performing actions related to the selected episode. These buttons can provide ancillary information and/or functionality such as additional information about the episode, parental controls, programming that is similar to the selected episode, and the ability to rate the episode in question. For example, buttons can be included for previewing or playing the episode, for setting a reminder, and/or for setting an adult lock.

The window is preferably fixed such that content scrolls into the window, rather than moving the window to the content. The episodes can be easily scrolled into the window to facilitate viewing the episode title and information and to facilitate ease of ordering. Additionally, the scrolling can be done without refreshing or otherwise re-loading the screen such that the content moves in a somewhat continuous manner that is stylistically appealing to the subscriber.

In accordance with one aspect of the present invention, the series and episodes can be displayed in a flip menu. An episode can be selected and ordered from the flip menu. The flip menu can cover a limited portion of a television screen so that if an episode is currently being viewed, the episode can still be seen and heard in the remaining portion of the screen. The flip menu allows the subscriber quick and easy access to additional episodes, and preferably, additional episodes that are related to the currently tuned to episode or channel.

BRIEF DESCRIPTION OF THE DRAWINGS

FIG. 5 illustrates control panels that may be displayed during viewing of an on-demand episode in accordance with the present invention.

DETAILED DESCRIPTION OF THE PREFERRED EMBODIMENT(S)

Figure 1:
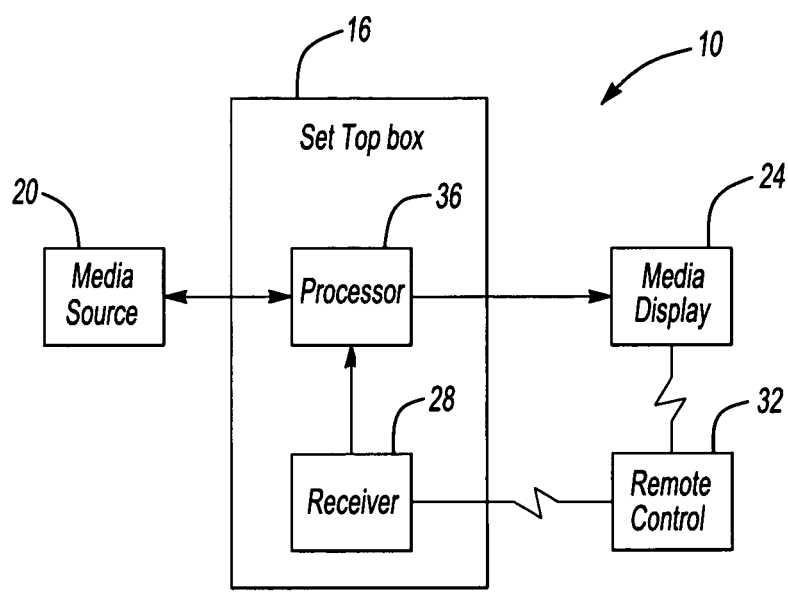
FIG. 1 illustrates a system for displaying an on-demand listings guide in accordance with the present invention.

FIG. 1 illustrates system 10 for displaying an on-demand listings guide in accordance with the present invention. System 10 includes transceiver settop box (STB) 16 to receive signals from media source 20 and to provide signals to media display 24. STB 16 can receive program signals from a cable provider and transmit program signals to a television or other media display, such as a PC, to display the program signals.

Media source 20 can be a cable television network that transmits and receives program signals to and from a programming source, such as an uplink, to at least one head-end server (not shown). The head-end server can communicate the signals with STB 16. The program signals can include video signals, audio signals, and program information for all episodes and series available on a cable television network. Transmission may occur via satellite or through cables, however, the present invention is not dependent upon the particular means of transmission or reception. The head-end server can include a program database that stores the program information.

STB 16 receives the program signals from media source 20 and controls which programs are displayed on associated display 24. As an alternative to the separate housing of STB 16, system components could be included in another signal reception or processing device, such as a satellite receiver, a television receiver, or a VCR. STB 16 could be eliminated and its functionality integrated with a television, a satellite receiver, or other media displaying device.

This arrangement allows system 10 to provide on-demand viewing to a subscriber. The on-demand viewing is actually on-demand as the subscriber can order and view any of the available episodes at any time. To facilitate the control of STB 16, receiver 28 can be provided for receiving remote control signals from remote control 32. Remote control 32 functions in a conventional manner, transmitting signals via infrared, radio frequency, or other signaling technology. Processor 36 can be provided to interpret and act upon the signals received from media source 20 and receiver 28, and then in turn provide the signals to media display 24 in accordance with the present invention.

As one skilled in the art will appreciate, system 10 is merely one exemplary configuration for providing on-demand services to subscribers of on-demand services, and other configurations, including more or less components, could similarly be used without deviating from the scope and contemplation of the present invention.

The present invention is not limited to cable providers and the on-demand services which they provide. It is within the scope and contemplation of the present invention that the present invention be used with satellite systems and similar systems which provide on-demand services, including services which may operate through the Internet/world wide web.

Figure 2:
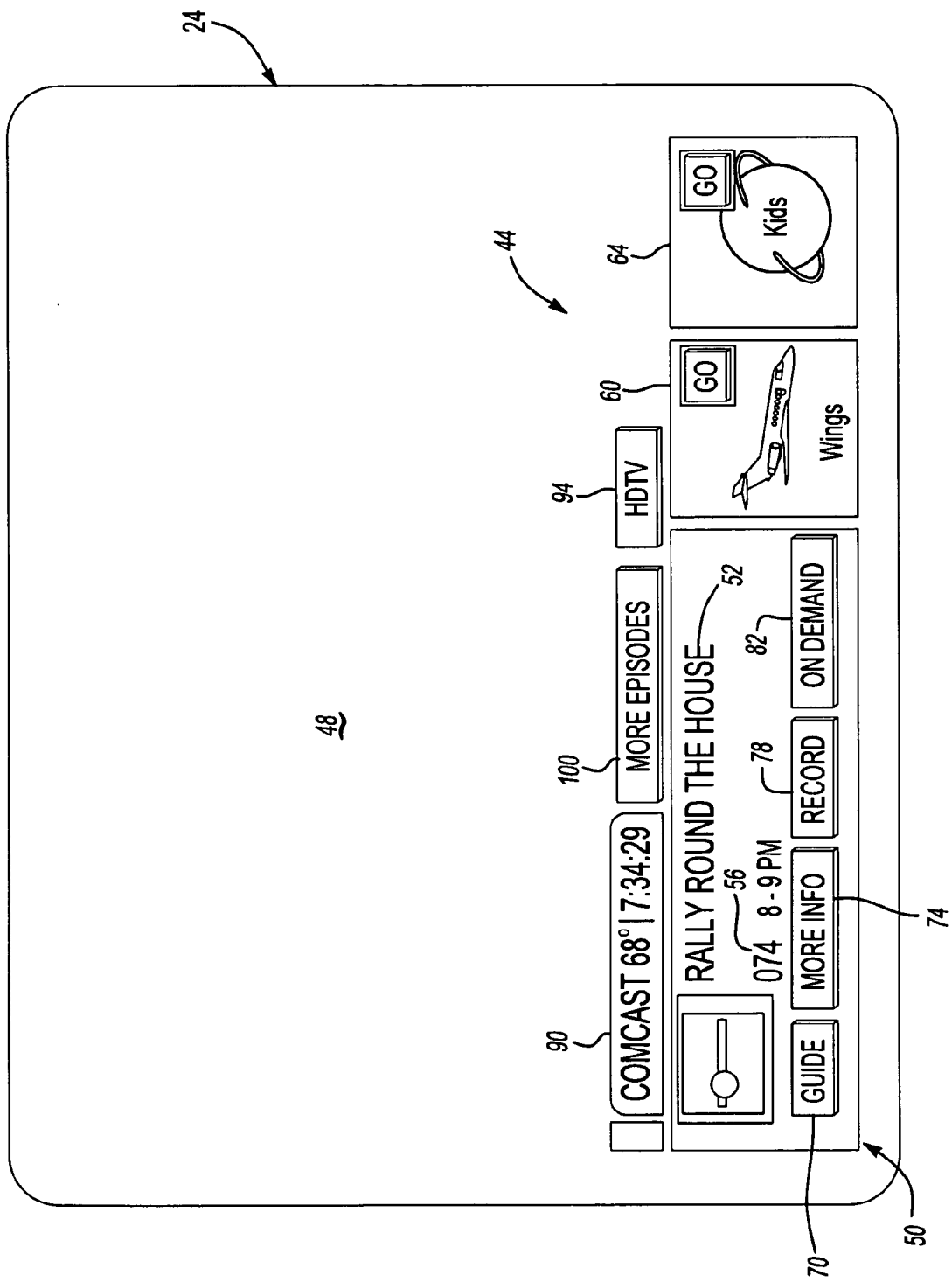
FIG. 2 illustrates a flip menu for displaying the on-demand listings guide in accordance with the present invention.

FIG. 2 illustrates flip menu 44 for providing an on-demand listings guide in accordance with the present invention. Flip menu 44 is generated by processor 36 based on the signals it receives from media source 20 and receiver 28. Flip menu 44 can be called up by the subscriber pressing a corresponding button on the remote control 32, tuning to a designated on-demand television channel, or pressing optional buttons provided on STB 16.

Flip menu 44 includes window 50 that displays graphical or textual indicia of the series currently tuned to and showing on screen 48. Menu 44 overlays a portion of any image showing on screen 48. Much of the image can still be viewed in the areas of screen 48 not taken up by menu 44. Moreover, the audio corresponding with the image can still be heard.

The series title is referred to by reference numeral 52 and the series channel is referred to by reference numeral 56. If the subscriber desires to view a different channel, the subscriber can press the desired channel number on remote control 32 to change the displayed series to whatever series is currently shown on the new channel.

Additional windows 60 and 64 are provided to show additional series which relate to the series identified in window 50. The association of the series in windows 60 and 64 with the series in window 50 is established by the signals provide by media source 20, and can be changed or manipulated as desired. Optionally, windows 60 and 64 can include favorite series or most viewed series. Still further, windows 60 and 64 can change the displayed series on a time-based schedule, which may be helpful for advertising other series. The data for manipulating windows 60 and 64 can originate from media source 20, and in particular from the head-end server (not shown), such that it can be downloaded to STB 16.

Still further, window 50 can include buttons 70, 74, 78, and 82 that can be actuated to pull up a television channel guide, to obtain more information to record, and to call up a series on-demand, respectively. The actuation of the buttons can be done by the subscriber moving arrows provided on remote control 32 that moves a cursor to select the desired buttons. Preferably, the selected button can be differentiated from the non-selected buttons by the cursor acting as a highlighter for highlighting in yellow, or in another manner, such as by outlining or otherwise calling out the selected button.

GUIDE button 70 displays an electronic programming guide (EPG) relating to non-on-demand channels and/or pay-per-view channels, as one skilled in the art will appreciate. MORE INFO button 74 pulls up series information relating the series shown in window 50. RECORD button 78 allows the subscriber to record the current show if they have a personal video recording device. Preferably, the show can be recorded to the subscriber's in-home personal video recorder or captured on a head-end based networked video recorder, which can then be downloaded to STB 16.

Optionally, additional window 90 can be provided for communicating secondary information to the subscriber. As shown, window 90 includes the name of the media provider (i.e., Comcast), the current outside temperature in the area of the subscriber, and the current time in the area of the subscriber.

HIGH DEFINITION TELEVISION (HDTV) button 94 can also be included to allow one- or two-click access to an episode if it is also available in a high-definition format. This can be advantageous because it allows the subscriber to easily access a high definition broadcast, if it is available, without having to navigate through additional screens.

The present invention contemplates a nomenclature for distinguishing between series and episodes. The series designation refers to a general classification of programs and the episodes definition refers to particular programs available on-demand within the general classification. The series designation can refer to genres, sit-com series, movie channels, and the like which can provide a general classification for defining a number of episode available within the classification.

The episodes refer to individual programs which can be classified under the more general series classification. The episodes can include specific episodes within a sit-com series, or specific movies available from a movie channel, such as HBO or HBO Family. The designations and classifications for the various series and episodes can be provided by media source 20, and, in particular, the head-end, such that the content of data can be programmable by media source 20 and downloaded to STB 16. Preferably, media source 20 can continuously update and change the available series and episodes as desired to include new series and episodes.

Figure 3:
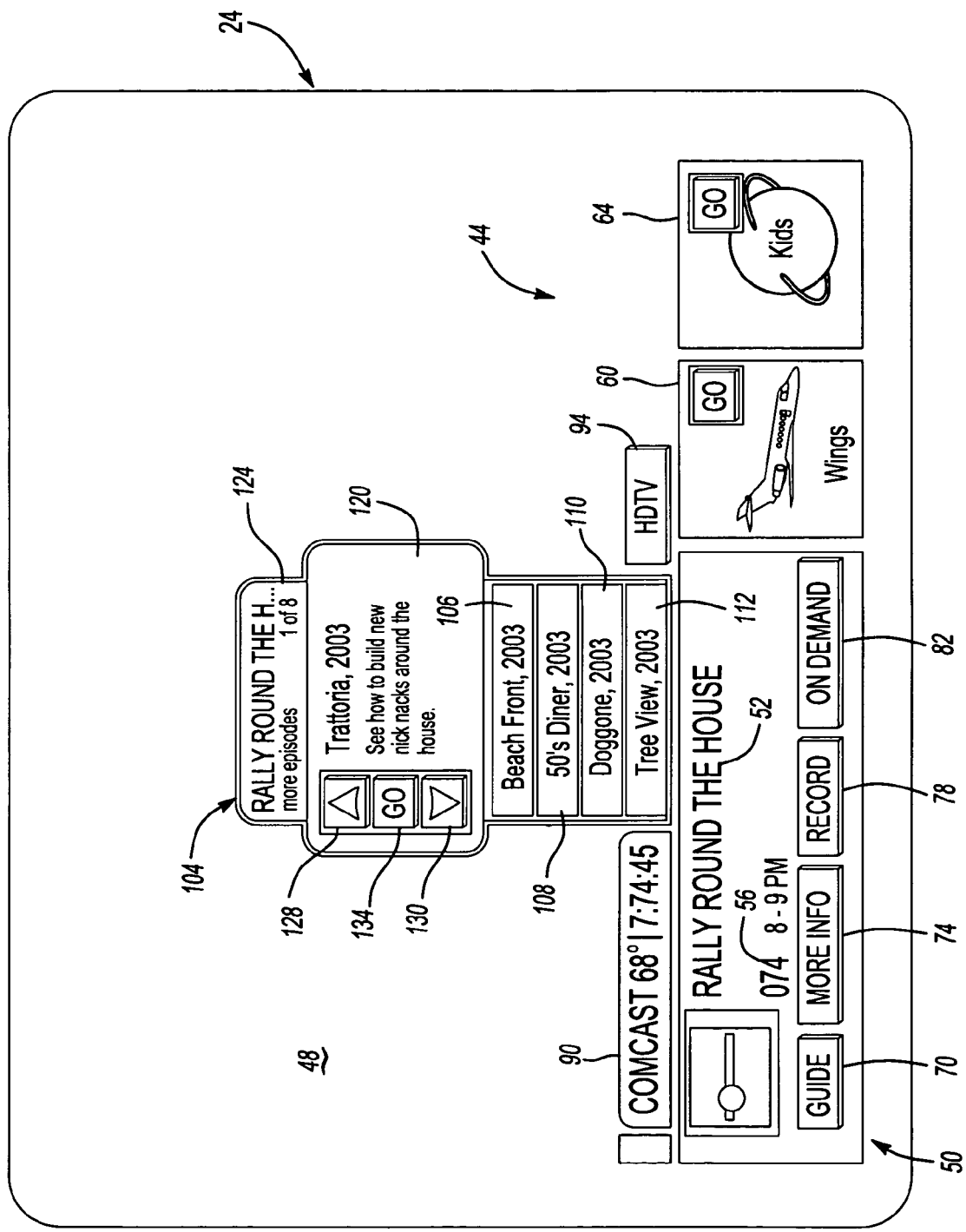
FIG. 3 illustrates the flip menu further including an episode navigation tree in accordance with the present invention.

MORE EPISODES button 100 can be provided to view additional episodes related to the series shown in window 50. FIG. 3 illustrates some of the additional episodes which may appear in pop-up window 104 with selection of the MORE EPISODES button 100. Four episode slots 106, 108, 110, and 112 appear, along with magnified window 120, and series indicator 124. Of course, more or less episode slots are contemplated in accordance with the present invention.

The five episodes referred to by reference numerals 106, 108, 110, 112, and 120 relate to episodes, or sub-categories, which are available under the generalized category of Rally Round The House. These episodes include the Tree View episode, the Doggone episode, the 50's Dinner episode, the Beach Front episode, and the Trattoria episode. If the series selected in window 50 was a movie channel, such as HBO Family, then a number of movie titles would appear in episode slots 106, 108, 110, and 112, in addition to window 120.

Window 120 calls out a selected episode and provides episode information regarding additional details of the selected episode. Window 120 is preferably magnified in the sense that it is larger in size than the other episode slots 106, 108, 110, and 112. Preferably, the text in window 120 the same size as the non-magnified episodes. However, window 120 can be configured such that the episode title, and even the episode information, may be magnified to appear larger than the other episodes.

Window 120 includes up arrow 128, down arrow 130, and Go button 134. Up arrow 128 and down arrow 130 can be actuated to change the episode shown in window 120. This allows the subscriber to select other episodes for ordering. Go button 134 can be actuated to order the episode in window 120.

Window 120 can be fixed relative to any of slots 106, 108, 110, and 112. As depicted herein, window 120 is fixed above slot 106 such that it does not move. Window 120 could be fixed above, below, or in-between any of slots 106, 108, 110, and 112 without deviating from the scope and contemplation of the present invention. Alternatively, window 120 could be movable to select the desired episode with actuation of up and down arrows 128 and 130 to move window up and down between slots 106, 108, 110, and 112.

Window 120 is preferably fixed relative to episode slots 106, 108, 110, and 112 such that actuation of up arrow 128 and down arrow 130 scrolls the episode titles into window 120 beginning with the episode in slot 106. The scrolling of content into window 120 is done without any re-loading or refreshing such that it provides a seamless process to enhance the stylistic integrity of guide 44 and the appearance of continuous navigation to the subscriber.

Up arrow 128, down arrow 130, and Go button 134 can be eliminated in favor of arrowless features which allow the subscriber to utilize arrow buttons or other means provided on remote control 32 to navigate through window 120. The content corresponding with the episodes would automatically scroll with actuation of remote control arrow buttons into and out of magnified window 120. An additional button, such as a go or enter button, can be included on remote control 32 to view the desired episode on-demand.

Guide 44 can also include an audio feature (not shown) that produces sounds. The audio feature can chime, click, or make some other sound each time the selected episode is changed or the selected series is changed. Similar sounds can also be generated for actuation of the various buttons and menus selections. The sounds can facilitate ease of use by signaling to the subscriber that the desired input was received.

Figure 4:
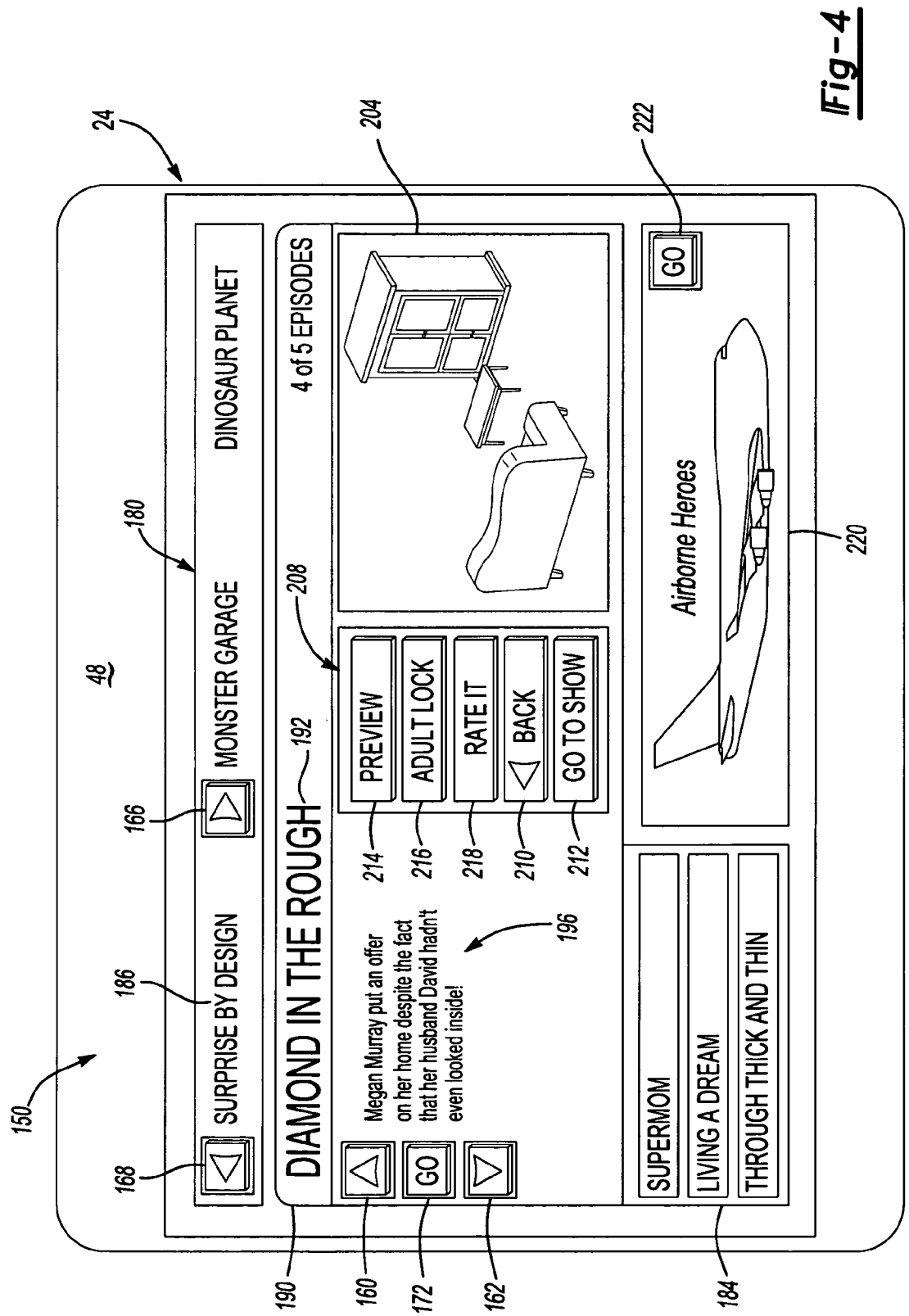
FIG. 4 illustrates a full-screen guide menu for displaying the on-demand listings guide in accordance with the present invention.

FIG. 4 illustrates a full-screen guide menu 150 for displaying the on-demand listings guide in accordance with the present invention. Preferably, guide 150 is substantially full-screen in size to accommodate the additional series and episodes which are not shown in FIGS. 2-3. Unlike guide 44, guide 150 covers all or most of the image displayed on screen 48. The audio can be heard even though the image is covered so that the subscriber can at least continue to listen to the current programming.

Guide 150 is navigable in a manner similar to the navigation of FIGS. 2-3. As shown, up arrow 160, down arrow 162, right arrow 166, left arrow 168, and Go button 172 are provided for navigation within guide 150. However, as described above, arrowless features could be provided on remote control 32 to provide similar navigation.

Guide 150 includes a number of series in series bar 180 which correspond to other available series. Optionally, however, additional series can be included in bar 180 which relate to favorite or pre-programmed series for the given subscriber. A number of episodes appear in episode bar 184 that correspond with the selected series 186 in series bar 180. Window 190 selects series 186 and episode 192, along with providing additional episode information 196 relating to the selected episode.

To change the selected episode and/or series, arrows 160, 162, 166, and 168 are actuated. For example, to change the episode, up arrow 160 and down arrow 162 can be actuated to change episode content up and down and into window 190. Likewise, right arrow 166 and left arrow 168 can be actuated to move the series content into window 190. This navigation can also be done without arrows 160, 162, 166, and 168 by using the arrows on the remote control 32.

Window 190 is preferably fixed such that actuation of arrows 160, 162, 166, and 168 scrolls the other episodes into window 190. The scrolling of content into window 190 is done without any re-loading or refreshing such that it provides a seamless process to enhance the stylistic integrity of guide 150 and the appearance of continuous navigation to the subscriber.

Window 190 calls out a selected episode and provides episode information regarding additional details of the selected episode. Window 190 is magnified in the sense that it is larger in size than the other episode in episode bar 184. Window 190 can be configured such that the episode title, and even the episode information, may be magnified to appear larger than the other episodes shown in bar 184. This can help distinguish the selected episode from the non-selected episode. Further, the selected series title 186 could also be magnified for a similar purpose.

Window 190 can include display portion 204 which displays a static image of the selected episode 192. This can be helpful to the subscriber when deciding whether to view the episode on-demand. The image is determined by media source 20, and preferably includes the lead actor or other distinguishing feature which may help the subscriber identify the series with some known entity or personality.

In contrast to flip menu 44, GO button 172 can then be actuated to access secondary menu 208. Secondary menu 208 includes BACK button 210, GO TO SHOW button 212, PREVIEW button 214, ADULT LOCK button 216, and RATE IT button 218. BACK button 210 takes the subscriber back to arrows 160, 162, and 172. This is done so that the subscriber can go back and change the series and/or episode. GO TO SHOW button 212 orders the episode.

PREVIEW button 214 can be actuated to play a preview in display portion 204, instead of viewing only the static image. This allows the subscriber to view a trailer or other canned sample of the episode to further facilitate their decision making process in selecting which episode to view on-demand. Preferably, the preview also begins playing without any re-loading or refreshing of guide 150 such that it provides a seamless process to enhance the stylistic integrity of guide and the appearance of continuous navigation to the subscriber.

ADULT LOCK button 216 can be actuated to prevent others from accessing the episode without entering a password. This can be helpful to prevent youths and other individuals from viewing undesirable material. RATE IT button 218 allows the user to rate the show and to see the ratings of others in their community and nationwide. Other buttons could be included, such as a SIMILAR CONTENT button which allows the user to see programming similar to the show and series that have been selected.

Optionally, guide 150 can further include window 220 for advertising other televised material or networks that are related to the current broadcast or series. The series in window 220 can be tuned to by navigation to window 220 and activation of GO button 222. Additionally, the image in window 220 can be changed over time to display other series.

FIG. 5 illustrates overlay control panels 224 and 226 that appear during on-demand viewing. Preferably, control panels 224 and 226 appear for a few seconds upon initial loading of the demanded episode and then recede to the background, whereupon they can be called back upon actuation of a menu button or other means on remote control 32.

Control panel 224 includes CHAT button 230, SAVE button 232, and EXIT button 234. CHAT button 230 allows the viewer to engage in two-way communication with one or more other users. SAVE button 232 allows the user to save the current series or episode to a list of favorites. EXIT button 234 allows the user to exit back to the on-demand interface, either guide 150 or flip menu 44, the selection of which is preferably determined by media source 20.

Control panel 226 includes fast-forward button 240, rewind button 242, play/pause button 244, previous chapter button 248, next chapter button 250, and stop button 254. Actuation of these buttons provides the associated function such that the subscriber can navigate through the viewed episode as is known in the art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
streaming a user-selected on-demand episode over a video on demand (VOD) channel onto a substantially large portion of a display screen;
displaying an episodic series title and graphical indicia of the episodic series for the user-selected on-demand episode in a first user controllable window that overlays a substantially small portion of the display screen such that the streamed on-demand episode is still visible; and
displaying additional windows in the substantially small portion of the display screen that include textual and graphical indicia of additional episodic series related to the episodic series displayed in the first window such that the streamed on-demand episode is still visible, wherein the additional episodic series include most viewed series related to the selected episode.

2. A method comprising:
providing a user controllable interface that allows a user to browse through and select one of a plurality of available episodic series titles;
displaying, in display windows, episode descriptions for a plurality of episodes available on-demand for the selected episodic series title, wherein the displayed episode descriptions each at least include a title and synopsis for the corresponding episode;
displaying additional windows in a substantially small portion of the user controllable interface that include textual and graphical indicia of additional episodic series related to the episode descriptions displayed in the display windows, wherein the additional episodic series include most viewed series related to the selected one of the plurality of available episodic series titles; and
providing navigation capability which includes scolling the episode desciptions into a fixed window to select the corresponding episode for on-demand viewing.

3. The method of claim 2, further comprising: magnifying one of the display windows.

4. The method of claim 3 further comprising displaying a number of actuatable buttons in one of the display windows, at least one of the buttons being a PREVIEW button to preview a selected episode.

5. The method of claim 4 wherein previewing the episode includes displaying the preview in one of the display windows.

6. The method of claim 4 wherein displaying the actuatable buttons includes at least displaying a GO TO SHOW button to order the selected episode.

7. The method of claim 4 wherein displaying the actuatable buttons includes displaying an ADULT LOCK button to prevent ordering of the selected episode.

8. The method of claim 4 wherein displaying the actuatable buttons includes displaying a RATE IT button to rate the selected episode.

9. The method of claim 2 further comprising ordering a user-selected episode for viewing, and further displaying a control panel during viewing of the selected episode, the control panel having actuatable buttons for executing operations relating to the selected episode.

10. The method of claim 9 wherein displaying the control panel includes displaying a button to enter a chat related to the selected episode.

11. The method of claim 9 wherein displaying the control panel includes displaying a button to record the selected episode.

12. The method of claim 2 wherein the scrolling includes scrolling in a first direction to change the displayed episodic series and scrolling in a second direction to change a selected episode.

13. The method of claim 2 wherein the episode descriptions are scrolled into the fixed window without any re-loading or refreshing.

14. The method of claim 2 wherein the displaying the episode descriptions includes displaying the episode title adjoined to other episode information for ease of association.

15. The method of claim 2 further comprising streaming a selected one of the episodes over a VOD channel for the on-demand viewing from a VOD server.

16. The method of claim 2 further comprising displaying a preview image for a highlighted one of the episode titles, the preview image providing at least one static image from at least one scene of the episode.

17. The method of claim 2 further comprising simultaneously displaying preview images for at least two of the displayed episode titles, each preview image providing at least one static image from at least one scene of the corresponding episode.

18. The method of claim 2 further comprising limiting the displayed episode descriptions to episodes previously specified by a service provider as being available for on-demand viewing.

19. A non-transitory computer readable storage medium having computer-executable program instructions stored thereon that when executed by a processor, cause the processor to:

process episodic series information received from a service provider over a network used to carry signals, the episodic series information listing a plurality of episodic series titles and a plurality of episode titles, each of the listed episode titles corresponding with an episode available on-demand for one of the episodic series titles;

display a user controllable interface that allows a user to browse through and select one of the episodic series titles in a display screen;

automatically display in the display screen at least a plurality of episode titles for the user selected episodic series title, wherein the displayed episode titles are limited to the episode titles listed in the episodic series information; and automatically display in the display screen textual and graphical indicia of additional episodic series related to the episodic series title selected by the user, wherein the additional episodic series include most viewed series related to the selected episodic series title.

20. The non-transitory computer-readable medium of claim 19 further including instructions to display the episode titles without requiring the user to identify the episode titles in advance of being displayed.

21. The non-transitory computer-readable medium of claim 19 further including instructions to display an episode synopsis for each displayed episode title.

22. The non-transitory computer-readable medium of claim 19 further including instructions to request configuration of a VOD channel used to provide on-demand viewing of a selected one of the episode titles.

23. An apparatus comprising:
a processor; and
a memory configured to store computer readable instructions that, when executed by the processor, cause the processor to perform a method comprising:

processing episodic series information received from a service provider over a network used to carry signals, the episodic series information listing a plurality of episodic series titles and a plurality of episode titles, each of the listed episode titles corresponding with an episode available on-demand for one of the episodic series titles;

displaying a user controllable interface that allows a user to browse through and select one of the episodic series titles in a display screen;

automatically displaying in the display screen at least a plurality of episode titles for the user selected episodic series title, wherein the displayed episode titles are limited to the episode titles listed in the episodic series information; and automatically displaying in the display screen textual and graphical indicia of additional episodic series related to the episodic series title selected by the user, wherein the additional episodic series include most viewed series related to the selected episodic series title.

24. The apparatus of claim 23, wherein the processor further performs: displaying the episode titles without requiring the user to identify the episode titles in advance of being displayed.

25. The apparatus of claim 23, wherein the processor further performs: displaying an episode synopsis for each displayed episode title.

26. The apparatus of claim 23, wherein the processor further performs: requesting configuration of a VOD channel used to provide on-demand viewing of a selected one of the episode titles.

\* \* \* \* \*